(12) United States Patent
Liang

(10) Patent No.: US 10,609,553 B2
(45) Date of Patent: Mar. 31, 2020

(54) DATA TRANSMISSION METHOD, FIRST DEVICE, AND SECOND DEVICE

(71) Applicant: CHINA ACADEMY OF TELECOMMUNICATIONS TECHNOLOGY, Beijing (CN)

(72) Inventor: Jing Liang, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 16/321,822

(22) PCT Filed: Jun. 7, 2017

(86) PCT No.: PCT/CN2017/087486
§ 371 (c)(1),
(2) Date: Jan. 29, 2019

(87) PCT Pub. No.: WO2018/019030
PCT Pub. Date: Feb. 1, 2018

(65) Prior Publication Data
US 2019/0174305 A1    Jun. 6, 2019

(30) Foreign Application Priority Data
Jul. 29, 2016    (CN) .......................... 2016 1 0619316

(51) Int. Cl.
*H04M 1/66* (2006.01)
*H04W 12/00* (2009.01)
(Continued)

(52) U.S. Cl.
CPC ................ *H04W 12/00512* (2019.01); *H04W 12/00409* (2019.01); *H04W 12/00516* (2019.01);
(Continued)

(58) Field of Classification Search
CPC ..... H04W 12/02; H04W 12/06; H04W 12/08; H04W 12/12; H04W 88/02
(Continued)

(56) References Cited

U.S. PATENT DOCUMENTS

2009/0276629 A1    11/2009    Wu et al.
2009/0296934 A1    12/2009    Qing et al.
(Continued)

FOREIGN PATENT DOCUMENTS

CN    101005495 A    7/2007
CN    101256606 A    9/2008
(Continued)

OTHER PUBLICATIONS

English and Chinese Translations of the International Search Report and the Written Opinion of the International Searching Authority for International Application No. PCT/CN2017/087486 dated Aug. 25, 2017.
(Continued)

*Primary Examiner* — Temica M Beamer
(74) *Attorney, Agent, or Firm* — Womble Bond Dickinson (US) LLP

(57) ABSTRACT

A data transmission method, a first device, and a second device, for use in implementing secure data transmission between a terminal device in a non-active state and a base station. The method comprises: a first device determines a transmission message comprising transmission data and a secure context identifier of a terminal device, the terminal device being in a non-active state; the first device sends the transmission message to a second device; the second device matches the secure context identifier of the terminal device with a secure context identifier of at least one local terminal device, and determines, on the basis of the matching result, whether to activate the security of the terminal device.

19 Claims, 13 Drawing Sheets

(51) Int. Cl.
*H04W 12/10* (2009.01)
*H04W 12/04* (2009.01)
*H04L 29/06* (2006.01)
*H04W 8/24* (2009.01)

(52) U.S. Cl.
CPC ... *H04W 12/0401* (2019.01); *H04W 12/1006* (2019.01); *H04L 63/162* (2013.01); *H04W 8/24* (2013.01); *Y02D 70/00* (2018.01); *Y02D 70/10* (2018.01); *Y02D 70/12* (2018.01); *Y02D 70/122* (2018.01)

(58) Field of Classification Search
USPC .................................................. 455/410, 411
See application file for complete search history.

(56) References Cited

U.S. PATENT DOCUMENTS

| | | | |
|---|---|---|---|
| 2010/0067444 A1 | 3/2010 | Faccin et al. | |
| 2011/0035592 A1 | 2/2011 | Cha et al. | |
| 2011/0269462 A1 | 11/2011 | Sagfors et al. | |
| 2013/0010620 A1 | 1/2013 | Dinan | |
| 2014/0228066 A1 | 8/2014 | Zhao et al. | |
| 2014/0295761 A1 | 10/2014 | Lo | |
| 2016/0345177 A1* | 11/2016 | Somasundaram | H04W 12/02 |
| 2017/0012956 A1* | 1/2017 | Lee | H04L 63/08 |
| 2017/0187691 A1* | 6/2017 | Lee | H04W 4/70 |
| 2019/0037459 A1* | 1/2019 | Pelletier | H04W 76/27 |

FOREIGN PATENT DOCUMENTS

| | | |
|---|---|---|
| CN | 101867931 A | 10/2010 |
| CN | 103036872 A | 4/2013 |
| CN | 103297961 A | 9/2013 |
| CN | 103313242 A | 9/2013 |
| KR | 20100133504 A | 12/2010 |
| WO | 2015085273 A1 | 6/2015 |
| WO | 2016105570 A1 | 6/2016 |

OTHER PUBLICATIONS

The Extended European Search Report for PCT Application No. 17833335.7 dated May 8, 2019, 8 pages.

The First Korean Office Action for Application No. 10-2019-7005771 dated Aug. 29, 2019, 9 pages, (Machine Translation).

Nokia, et al., "Editor Notes in RRC Suspend and Resume," 3GPP TSG-SA WG3 Meeting #84, Jul. 25-29, 2016, 4 pages, S3-160984, Chennai, India.

The Japanese Office Action for Application No. 2019-504721 dated Jan. 28, 2020, 4 pages.

* cited by examiner

DATA TRANSMISSION METHOD, FIRST DEVICE, AND SECOND DEVICE

CROSS-REFERENCE TO RELATED APPLICATIONS

This Patent application is a U.S. National Stage of International Application No. PCT/CN2017/087486, filed Jun. 7, 2017, which claims the benefit of Chinese Patent Application No. 201610619316.8, filed with the Chinese Patent Office on Jul. 29, 2016, and entitled "Method for transmitting data, a first device, and a second device", which was is incorporated by reference in its entirety.

FIELD

The present invention relates to the field of communications, and particularly to a method for transmitting data, a first device, and a second device.

BACKGROUND

As wireless communication systems are developing, there are a diversity of types of terminal devices, and types of services, and the following demands may coexist: saving power of a terminal device, saving network resource, and satisfying the various types of services. In order to satisfy, for a terminal device, the demands of saving power and rapid data transmission, the terminal device may be in an inactive state.

An inactive terminal device (i.e., a terminal device in an inactive state) is still connected with a core network, but does not perform any conventional operations in an air-interface connected state, e.g., a handover, uplink timing updating, radio link monitoring, etc., and is not allocated any terminal identifier (e.g., a Cell-Radio Network Temporary Identifier (C-RNTI)) to be used directly for air-interface transmission, thus the inactive terminal device cannot perform air-interface scheduled transmission directly. The inactive terminal device supports rapid data transmission. The rapid data transmission refers to that data are transmitted between the terminal device and a base station in one or two instances of transmission.

In the existing wireless communication systems, data can be transmitted securely between a terminal device and a base station only after the security of the terminal device is activated. The security of the terminal device is activated in a "three-handshake" mechanism, that is, messages shall be exchanged between the terminal device and the base station for three times, and the security of the terminal device can be activated only after all the messages are exchanged successfully for three times. The inactive terminal device shall support rapid data transmission, "three handshakes" may not be guaranteed while data are being transmitted, so data cannot be transmitted securely between the inactive terminal device and the base station in the security mechanism in the existing wireless communication systems.

In summary, it is highly desirable to provide a data transmission solution so as to transmit data securely between an inactive terminal device and a base station.

SUMMARY

Embodiments of the invention provide a method for transmitting data, a first device, and a second device so as to transmit data securely between an inactive terminal device and a base station.

Here when the first device is an inactive terminal device, the second device is a base station; or when the first device is a base station, the second device is an inactive terminal device.

In a first aspect, an embodiment of the invention provides a method for transmitting data, the method including:

determining, by a first device, a transmission message including transmission data, and a security context identifier of an inactive terminal device; and transmitting, by the first device, the transmission message to a second device;

wherein the security context identifier of the inactive terminal device is used for the second device to match the security context identifier of the inactive terminal device with a security context identifier of at least one local terminal device, and to decide whether to activate security of the inactive terminal device, according to a matching result.

In a possible implementation, before the first device determines the transmission message including the transmission data, and the security context identifier of the inactive terminal device, the method further includes:

protecting, by the first device, the transmission data for integrity using a security context corresponding to the security context identifier of the inactive terminal device.

In a possible implementation, the security context includes one or more of: a key, an encryption algorithm, an integrity-protection algorithm, a carrier identifier, a counter, or a security constant.

In a possible implementation, when the first device is the inactive terminal device, and the second device is a base station, the transmission message is layer-2 control signaling or a Radio Resource Control (RRC) message.

In a possible implementation, when the first device is a base station, and the second device is the inactive terminal device, the transmission message is one of:

layer-2 control signaling, a Radio Resource Control (RRC) message, or physical-layer control signaling.

In a second aspect, an embodiment of the invention provides a method for transmitting data, the method including:

receiving, by a second device, a transmission message transmitted from a first device, wherein the transmission message includes transmission data, and a security context identifier of an inactive terminal device;

matching, by the second device, the security context identifier of the inactive terminal device with a security context identifier of at least one local terminal device; and deciding, by the second device, whether to active security of the inactive terminal device according to a result of the matching.

In a possible implementation, the deciding, by the second device, whether to active the security of the inactive terminal device, according to the result of the matching includes:

when the security context identifier of the inactive terminal device is matched successfully with the security context identifier of the at least one local terminal device, activating, by the second device, the security of the inactive terminal device; or when the security context identifier of the inactive terminal device fails to be matched with the security context identifier of the at least one local terminal device, deciding, by the second device, not to activate the security of the inactive terminal device.

In a possible implementation, after the second device activates the security of the inactive terminal device, the method further includes:

obtaining, by the second device, a security context corresponding to the security context identifier of the inactive terminal device;

verifying, by the second device, the transmission data for integrity protection according to the security context; and deciding, by the second device, whether to transmit data with the first device according to a result of the verifying.

In a possible implementation, the deciding, by the second device, whether to transmit data with the first device according to the result of the verifying includes:

when the transmission data is verified successfully for integrity protection, deciding, by the second device, to transmit data with the first device; or when the transmission data fails to be verified for integrity protection, deciding, by the second device, not to transmit data with the first device.

In a possible implementation, the security context includes one or more of: a key, an encryption algorithm, an integrity-protection algorithm, a carrier identifier, a counter, or a security constant.

In a possible implementation, when the first device is the inactive terminal device, and the second device is a base station, the transmission message is layer-2 control signaling or a Radio Resource Control (RRC) message.

In a possible implementation, when the first device is a base station, and the second device is the inactive terminal device, the transmission message is one of:

layer-2 control signaling, a Radio Resource Control (RRC) message, or physical-layer control signaling.

In a third aspect, an embodiment of the invention provides a first device including:

a processing unit configured to determine a transmission message including transmission data, and a security context identifier of an inactive terminal device; and a transmitting unit configured to transmit the transmission message determined by the processing unit to a second device;

wherein the security context identifier of the inactive terminal device is used for the second device to match the security context identifier of the inactive terminal device with a security context identifier of at least one local terminal device, and to decide whether to activate security of the inactive terminal device, according to a matching result.

In a possible implementation, the processing unit is further configured:

to protect the transmission data for integrity using a security context corresponding to the security context identifier of the inactive terminal device before the transmission message including the transmission data, and the security context identifier of the inactive terminal device is determined.

In a possible implementation, the security context includes one or more of: a key, an encryption algorithm, an integrity-protection algorithm, a carrier identifier, a counter, or a security constant.

In a possible implementation, when the first device is the inactive terminal device, and the second device is a base station, the transmission message is layer-2 control signaling or a Radio Resource Control (RRC) message.

In a possible implementation, when the first device is a base station, and the second device is the inactive terminal device, the transmission message is one of:

layer-2 control signaling, a Radio Resource Control (RRC) message, and physical-layer control signaling.

In a fourth aspect, an embodiment of the invention provides a second device including:

a receiving unit configured to receive a transmission message transmitted from a first device, wherein the transmission message includes transmission data, and a security context identifier of an inactive terminal device; and a processing unit configured to match the security context identifier of the inactive terminal device in the transmission message received by the receiving unit with a security context identifier of at least one local terminal device, and to decide whether to active security of the inactive terminal device according to a matching result.

In a possible implementation, the processing unit configured to decide whether to active the security of the inactive terminal device, according to the matching result is configured:

when the security context identifier of the inactive terminal device is matched successfully with the security context identifier of the at least one local terminal device, to activate the security of the inactive terminal device; or when the security context identifier of the inactive terminal device fails to be matched with the security context identifier of the at least one local terminal device, to decide not to activate the security of the inactive terminal device.

In a possible implementation, the processing unit is further configured:

after the security of the inactive terminal device is activated, to obtain a security context corresponding to the security context identifier of the inactive terminal device;

to verify the transmission data for integrity protection according to the security context; and to decide whether to transmit data with the first device, according to a verification result.

In a possible implementation, the processing unit configured to decide whether to transmit data with the first device, according to the verification result is configured:

when the transmission data is verified successfully for integrity protection, to decide to transmit data with the first device; or when the transmission data fails to be verified for integrity protection, to decide not to transmit data with the first device.

In a possible implementation, the security context includes one or more of: a key, an encryption algorithm, an integrity-protection algorithm, a carrier identifier, a counter, or a security constant.

In a possible implementation, when the first device is the inactive terminal device, and the second device is a base station, the transmission message is layer-2 control signaling or a Radio Resource Control (RRC) message.

In a possible implementation, when the first device is a base station, and the second device is the inactive terminal device, the transmission message is one of:

layer-2 control signaling, a Radio Resource Control (RRC) message, and physical-layer control signaling.

In a fifth aspect, an embodiment of the invention provides another first device including: a processor, a memory, and a transceiver, wherein:

the processor is configured to read and execute program in the memory:

to determine a transmission message including transmission data, and a security context identifier of an inactive terminal device, and to transmit the transmission message to a second device through the transceiver;

wherein the the security context identifier of the inactive terminal device is used for the second device to match the security context identifier of the inactive terminal device with a security context identifier of at least one local terminal device, and to decide whether to activate security of the inactive terminal device, according to a matching result.

In a possible implementation, the processor is further configured:

to protect the transmission data for integrity using a security context corresponding to the security context identifier of the inactive terminal device before the transmission message including the transmission data, and the security context identifier of the inactive terminal device is determined.

In a possible implementation, the security context includes one or more of: a key, an encryption algorithm, an integrity-protection algorithm, a carrier identifier, a counter, and a security constant.

In a possible implementation, when the first device is the inactive terminal device, and the second device is a base station, the transmission message is layer-2 control signaling or an RRC message.

In a possible implementation, when the first device is a base station, and the second device is the inactive terminal device, the transmission message is one of:

layer-2 control signaling, an RRC message, and physical-layer control signaling.

In a sixth aspect, an embodiment of the invention provides another second device including: a processor, a memory, and a transceiver, wherein:

the processor is configured to read and execute program in the memory:

to receive, through the transceiver, a transmission message transmitted from a first device, wherein the transmission message includes transmission data, and a security context identifier of an inactive terminal device;

to match the security context identifier of the inactive terminal device in the transmission message received through the transceiver with a security context identifier of at least one local terminal device, and to decide whether to active security of the inactive terminal device according to a matching result.

In a possible implementation, the processor configured to decide whether to active the security of the inactive terminal device, according to the matching result is configured:

when the security context identifier of the inactive terminal device is matched successfully with the the security context identifier of the at least one local terminal device, to activate the security of the inactive terminal device; or when the security context identifier of the inactive terminal device fails to be matched with the security context identifier of the at least one local terminal device, to decide not to activate the security of the inactive terminal device.

In a possible implementation, the processor is further configured:

after the security of the inactive terminal device is activated, to obtain a security context corresponding to the security context identifier of the inactive terminal device;

to verify the transmission data for integrity protection according to the security context; and to decide whether to transmit data with the first device, according to a verification result.

In a possible implementation, the processor configured to decide whether to transmit data with the first device, according to the verification result is configured:

when the transmission data is verified successfully for integrity protection, to decide to transmit data with the first device; or when the transmission data fails to be verified for integrity protection, to decide not to transmit data with the first device.

In a possible implementation, the security context includes one or more of: a key, an encryption algorithm, an integrity-protection algorithm, a carrier identifier, a counter, and a security constant.

In a possible implementation, when the first device is the inactive terminal device, and the second device is a base station, the transmission message is layer-2 control signaling or an RRC message.

In a possible implementation, when the first device is a base station, and the second device is the inactive terminal device, the transmission message is one of:

layer-2 control signaling, an RRC message, and physical-layer control signaling.

In the technical solutions according to the embodiments of the invention, the first device transmits both the transmission data, and the security context identifier of the inactive terminal device to the second device, and the second device can match the security context identifier of the inactive terminal device with a security context identifier of at least one terminal device, and decide whether to activate the security of the inactive terminal device, according to a result of matching. For uplink data transmission, the first device is the inactive terminal device, and the second device is a base station; and for downlink data transmission, the first device is a base station, and the second device is the inactive terminal device. Accordingly with the method for transmitting data according to the embodiments of the invention, data can be transmitted securely between the inactive terminal device and the base station to thereby address the problem that the inactive terminal device cannot transmit data securely with the base station in the security mechanism in the existing traditional wireless communication systems.

DETAILED DESCRIPTION OF THE EMBODIMENTS

Figure 1:
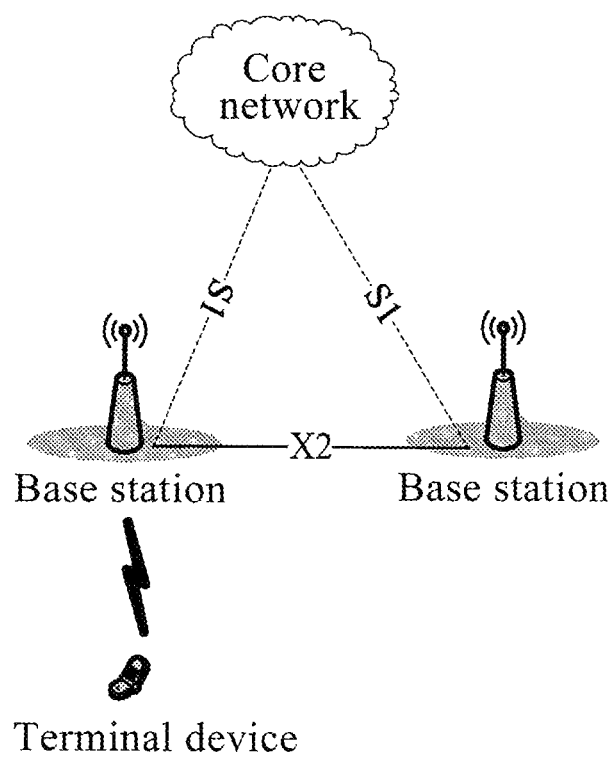
FIG. 1 is a schematic diagram of a network architecture of an LTE system to which an embodiment of the invention relates.

The technical solutions according to the embodiments of the invention will be described below clearly and fully with reference to the drawings in the embodiments of the invention, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

Embodiments of the invention provide a method for transmitting data, a first device, and a second device so as to transmit data securely between an inactive terminal device and a base station. For uplink data transmission, the first device is an inactive terminal device, and the second device is a base station; and for downlink data transmission, the first device is a base station, and the second device is an inactive terminal device. Here the method and the devices are based upon the same inventive idea, and since the devices address the problem under a similar principle to the method, reference can be made to an implementation of the method for implementations of the devices, and a repeated description thereof will be omitted here.

The terminal device as referred to in the embodiments of the invention can refer to a device providing a user with voice and/or data connectivity, a handheld device with a wireless connection function, or any other processing device connected with a wireless MODEM. The radio terminal device can communicate with one or more core networks over a Radio Access Network (RAN), and the radio terminal device can be a mobile terminal device, e.g., a mobile phone (or a "cellular" phone), and a computer with a mobile terminal device, e.g., a portable, pocket, handheld, built-in-computer or on-vehicle mobile device, which can exchange voice and/or data with the radio access network. For example, the terminal device may be a Personal Communication Service (PCS) phone, a cordless phone, a Session Initiation Protocol (SIP) phone, a Wireless Local Loop (WLL) station, a Personal Digital Assistant (PDA), etc. The radio terminal device can also be referred to as a system, a subscriber unit, a subscriber station, a mobile station, a mobile, a remote station, an access point, a remote terminal, an access terminal, a user terminal, a user agent, a user device, or a user equipment.

A base station as referred to in the embodiments of the invention can be a base station or an access point, or can refer to such a device in an access network that communicates with a radio terminal device over one or more sectors via an air interface. The base station can be configured to convert a received air frame into an Internet Protocol (IP) packet, and a received IP packet into an air frame, and operate as a router between the radio terminal device, and the remaining components of the access network, where the remaining components of the access network can include an IP network. The base station can further coordinate attribute management on the air interface. For example, the base station can be a Base Transceiver Station (BTS) in a Global System for Mobile Communications (GSM) or Code Division Multiple Access (CDMA) system, or can be a base station (Node B) in a Wide-band Code Division Multiple Access (WCDMA) system, or can be an evolved base station (Node B or eNB or e-Node B) in an LTE system. The base station can alternatively be a base station in a 5G system, e.g., a New Radio Access Technology (RAT) Node B (RANB). The embodiments of the invention will not be limited thereto.

Figure 2:
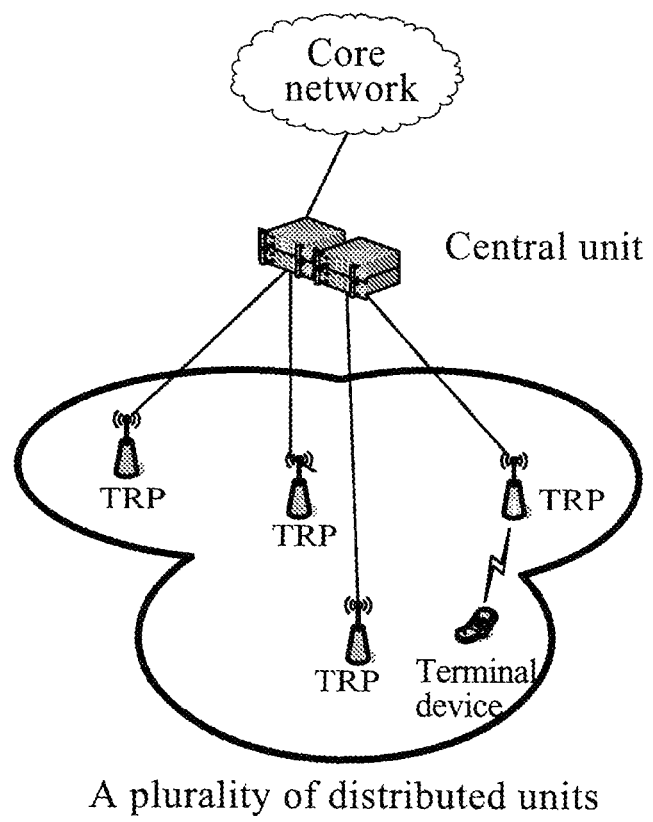
FIG. 2 is a schematic diagram of a possible network architecture of a mobile communication 5G system to which an embodiment of the invention relates.

The technical solutions according to the embodiments of the invention are applicable to a Radio Access Network (RAN). The base station and the terminal device as referred to in the embodiments of the invention can be embodied in a network architecture of a Long Term Evolution (LTE) system as illustrated in FIG. 1, and the terminal device exchanges information with the base station in the network architecture as illustrated in FIG. 1. The base station and the terminal device as referred to in the embodiments of the invention can alternatively be embodied in a possible network architecture of a mobile communication 5G system as illustrated in FIG. 2; and in the network architecture as illustrated in FIG. 2, network-side nodes include a Central Unit (CU) and Distributed Units (DUs), a central unit controls a plurality of distributed units deployed in some area, and these distributed units exchange information with a terminal device through Transmission and Reception Points (TRPs), where the central unit and the distributed units are referred collectively to as a base station.

The technical solutions according to the embodiments of the invention will be described below in details with reference particular embodiments thereof, and it shall be noted that the order in which the embodiments are presented merely represent a sequential order of the embodiments, and does not represent a superiority or inferiority of a technical solution according to an embodiment of the invention to a technical solution according to another embodiment of the invention.

First Embodiment

Figure 3:
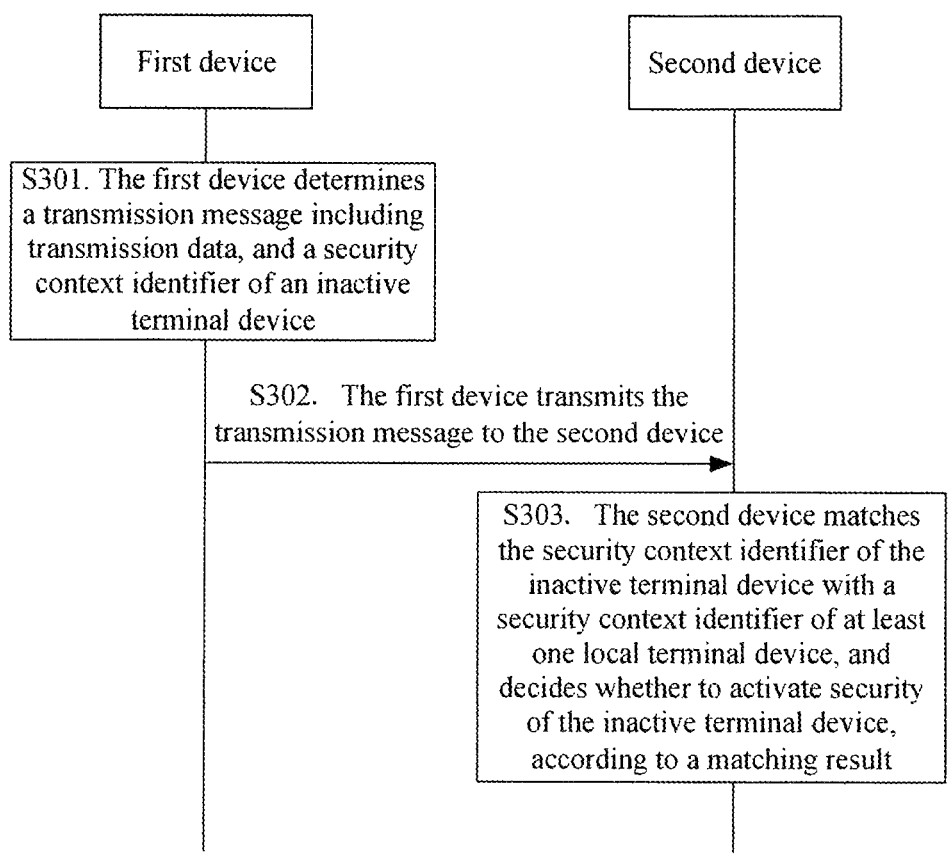
FIG. 3 is a schematic flow chart of a method for transmitting data according to an embodiment of the invention.

As illustrated in FIG. 3, an embodiment of the invention provides a method for transmitting data, and in this method, a first device interacts with a second device as follows.

In the step S301, the first device determines a transmission message including transmission data, and a security context identifier of an inactive terminal device;

The inactive terminal device remains connected with a core network, but does not perform any conventional operations in an air-interface connected state, e.g., a handover, uplink timing updating, radio link monitoring, etc., and is not allocated any terminal identifier (e.g., a C-RNTI) to be used directly for air-interface transmission, thus the inactive terminal device can not perform air-interface scheduled transmission directly. The inactive terminal device supports rapid data transmission, which refers to that data are transmitted between the terminal device and a base station in one or two instances of transmission, so that the terminal device can transmit data rapidly as needed while saving its power.

The security context identifier of a terminal device is allocated by a base station for the terminal device, and can be a resume ID, an inactive ID, a security ID, etc.

In the step S302, the first device transmits the transmission message to the second device.

In the step S303, the second device matches the security context identifier of the inactive terminal device with a security context identifier of at least one local terminal device, and to decide whether to activate security of the inactive terminal device, according to a matching result.

Optionally the second device decides whether to activate the security of the inactive terminal device, according to the matching result in the step S303 as follows.

When the security context identifier of the inactive terminal device is matched successfully with the security context identifier of the at least one local terminal device, the second device activates the security of the inactive terminal device;

When the security context identifier of the inactive terminal device fails to be matched with the security context identifier of the at least one local terminal device, the second device decides not to activate the security of the inactive terminal device.

Optionally the first device can protect the transmission data for integrity using a security context corresponding to the security context identifier of the inactive terminal device in the step S301 before the first device determines the transmission message including the transmission data, and the security context identifier of the inactive terminal device. For example, the first device can protect the transmission data for integrity by carrying an integrity-protection verification code after a data packet of the transmission data, and the integrity-protection verification code can be obtained according to the security context corresponding to the security context identifier of the inactive terminal device.

Here the security context for the first device to protect the transmission data for integrity includes but will not be limited to one or more of: a key, an encryption algorithm, an integrity-protection algorithm, a carrier identifier, a counter, and a security constant.

If the first device protects the transmission data for integrity using the security context corresponding to the security context identifier of the inactive terminal device, then the second device will obtain the security context corresponding to the security context identifier of the inactive terminal device after activating the security of the inactive terminal device, verify the transmission data for integrity protection according to the security context, and decide whether to transmit data with the first device, according to a verification result.

Optionally the second device decides whether to transmit data with the first device, according to the verification result as follows:

When the transmission data is verified successfully for integrity protection, the second device decides to transmit data with the second device;

When the transmission data fails to be verified for integrity protection, the second device decides not to transmit data with the second device.

Here the security context for the second device to verify the transmission data for integrity protection includes but will not be limited to one or more of: a key, an encryption algorithm, an integrity-protection algorithm, a carrier identifier, a counter, and a security constant.

The type of the security context for the first device to protect the transmission data for integrity shall agree with the type of the security context for the second device to verify the transmission data for integrity protection. For example, if the first device protects the transmission data for integrity using a key, then the second device will verify the transmission data for integrity protection using the key.

For uplink data transmission, the first device is the inactive terminal device, and the second device is a base station.

The inactive terminal device initiates uplink data transmission over a common resource or a contentious resource, and an uplink transmission message including the transmission data, and the security context identifier of the inactive terminal device can be layer-2 control signaling or a Radio Resource Control (RRC) message. Optionally the inactive terminal device can protect the transmission data for integrity using the security context corresponding to its security context identifier. The inactive terminal device transmits the uplink transmission message including the transmission data, and the security context identifier of the inactive terminal device to a base station upon determining the uplink transmission message.

Upon reception of the uplink transmission message, including the transmission data, and the security context identifier of the inactive terminal device, transmitted by the inactive terminal device over the common resource or the contentious resource, the base station matches the security context identifier of the inactive terminal device in the uplink transmission message with a local security context identifier of at least one local terminal device. The base station stores security context identifiers of a plurality of local terminal devices. If the base station determines as a result of matching that there is a locally stored security context identifier which is the same as the security context identifier of the inactive terminal device in the uplink transmission message, then the base station will activate the security of the inactive terminal device transmitting the uplink transmission message, and the base station will determine that data can be transmitted security with the inactive terminal device; and if the base station determines as a result of matching that there is not any locally stored security context identifier which is the same as the security context identifier of the inactive terminal device in the uplink transmission message, then the base station will decide not to activate the security of the inactive terminal device transmitting the uplink transmission message, and there may be a security risk if data are transmitted with the inactive terminal device. Optionally if the inactive terminal device protects the transmission data for security using the security context corresponding to its security context identifier, then the base station will search for the security context corresponding to the security context identifier of the inactive terminal device after activating the security of the inactive terminal device, and verify the transmission data for integrity protection using the security context found as a result of the search to thereby further verify the transmission data for security.

For downlink data transmission, the first device is a base station, and the second device is an inactive terminal device.

The base station initiates downlink data transmission to the inactive terminal device over a common resource, and a downlink transmission message including the transmission data, and the security context identifier of the inactive terminal device can be layer-2 control signaling or an RRC message or physical-layer control signaling. When the downlink transmission message is physical-layer control signaling, the security context identifier of the inactive terminal device can be carried in the physical-layer control signaling as a scrambling code to scramble the physical-layer control signaling. Optionally the base station can protect the transmission data for integrity using the security context corresponding to the security context identifier of the inactive terminal device. The base station transmits the downlink transmission message including the transmission data, and the security context identifier of the inactive terminal device to the inactive terminal device upon determining the downlink transmission message.

Upon reception of the downlink transmission message, including the transmission data, and the security context identifier of the inactive terminal device, transmitted by the base station over the common resource, the inactive terminal device matches the security context identifier of the inactive terminal device in the downlink transmission message with a local security context identifier of the inactive terminal device. The inactive terminal device stores its security context identifier locally. If the inactive terminal device determines as a result of matching that the locally stored security context identifier thereof is the same as the security context identifier of the inactive terminal device in the downlink transmission message, then the inactive terminal device will activate its security, and the inactive terminal device will determine that data can be transmitted security with the base station; and if the locally stored security context identifier thereof is different from the security context identifier of the inactive terminal device in the downlink transmission message, then the inactive terminal device will decide not to activate its security, and there may be a security risk if the inactive terminal device transmits data with the base station. Optionally if the base station protects the transmission data for security using the security context corresponding to the security context identifier of the inactive terminal device, then the inactive terminal device receiving the transmission data will verify the transmission data for integrity protection using the security context corresponding to its security context identifier after activating its security to thereby further verify the transmission data for security.

First Example

Figure 4:
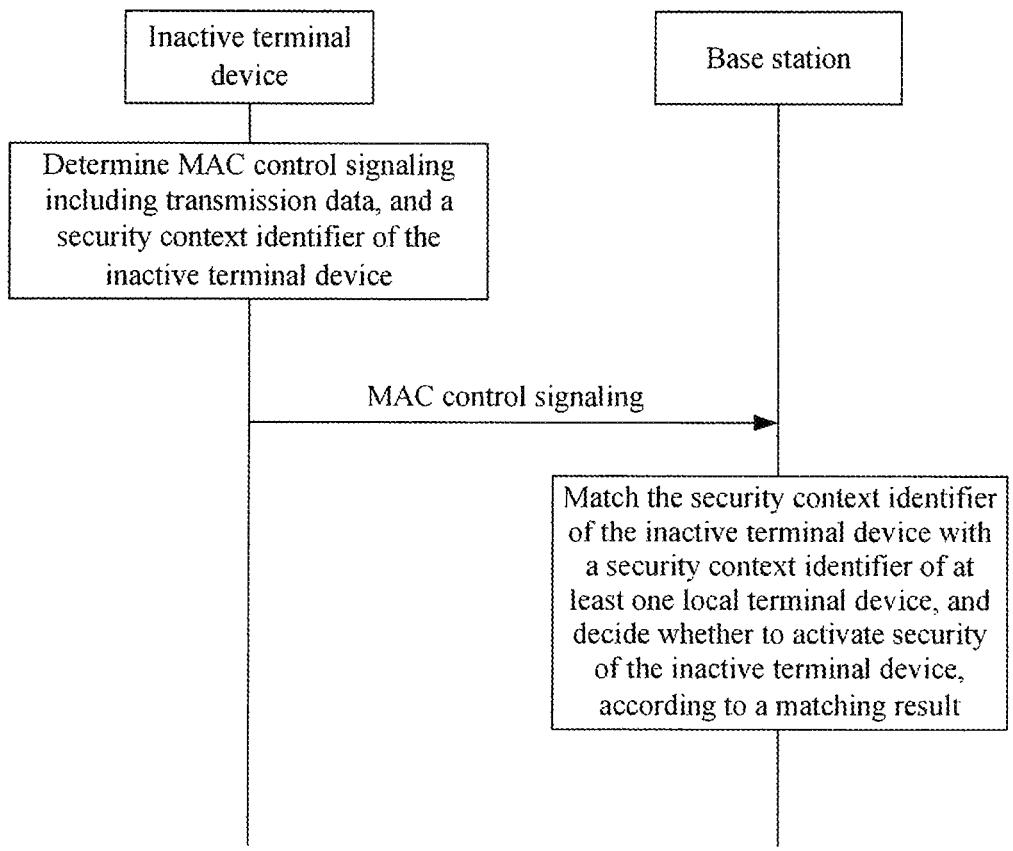
FIG. 4 is a schematic flow chart of a method for transmitting uplink data according to an embodiment of the invention.

As illustrated in FIG. 4, the inactive terminal device initiates uplink data transmission to the base station. Transmission data and a security context identifier of the inactive terminal device are carried in Media Access Control (MAC) control signaling. Optionally the terminal device can protect the transmission data for integrity. Reference can be made to the description above of uplink data transmission for a process of uplink data transmission, so a repeated description thereof will be omitted here.

Second Example

Figure 5:
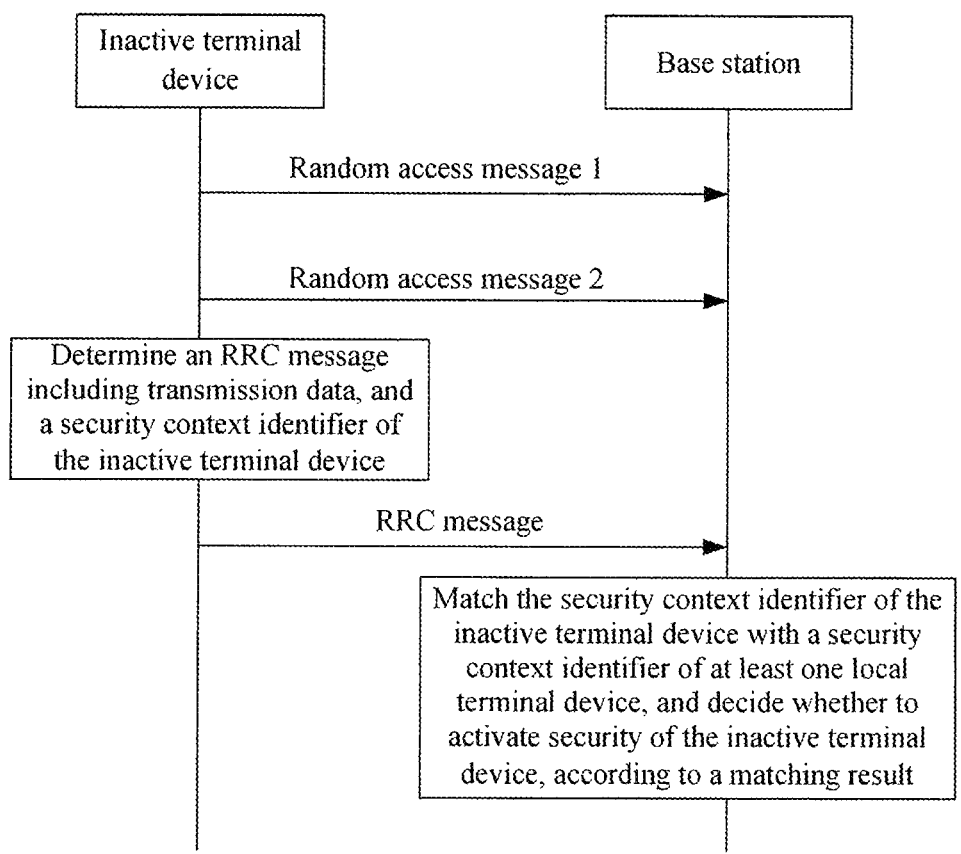
FIG. 5 is a schematic flow chart of another method for transmitting uplink data according to an embodiment of the invention.

As illustrated in FIG. 5, the inactive terminal device initiates a random access procedure to the base station. Transmission data and a security context identifier of the inactive terminal device are carried in an RRC message. Optionally the terminal device can protect the transmission data for integrity. Reference can be made to the description above of uplink data transmission for a process of uplink data transmission, so a repeated description thereof will be omitted here.

Third Example

Figure 6:
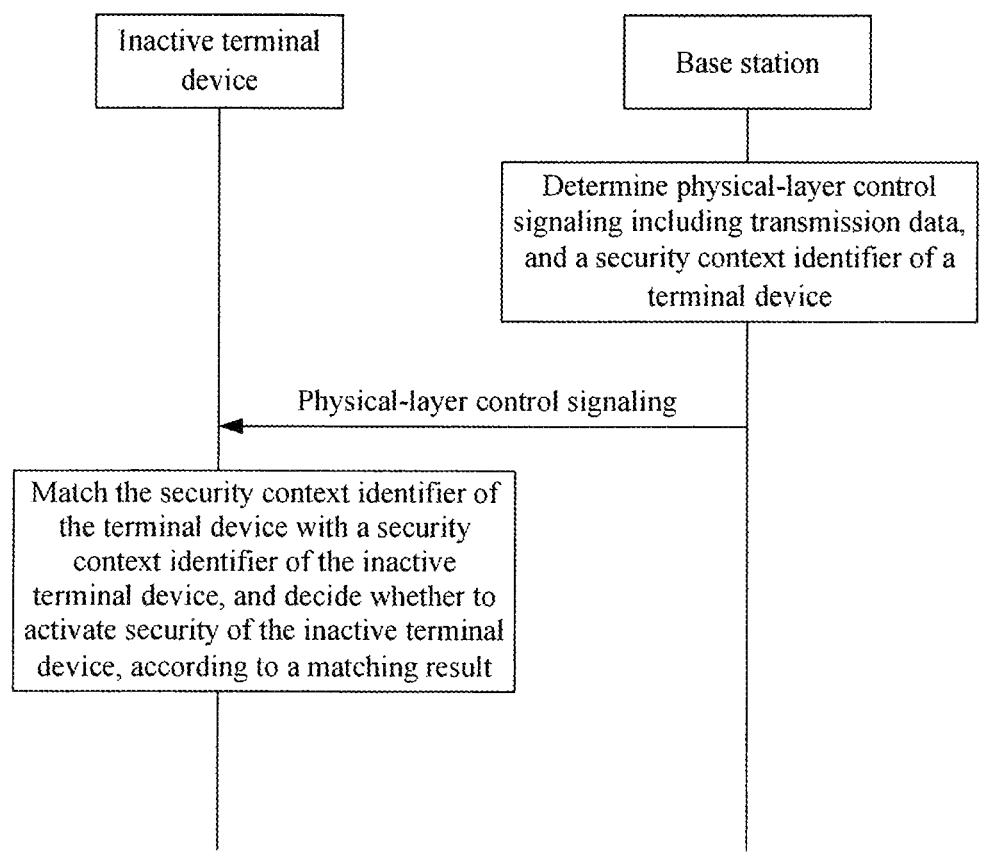
FIG. 6 is a schematic flow chart of a method for transmitting downlink data according to an embodiment of the invention.

As illustrated in FIG. 6, the base station initiates downlink data transmission to the inactive terminal device. Transmission data and a security context identifier of the terminal device are carried in physical-layer control signaling. Optionally the base station can protect the transmission data for integrity. Reference can be made to the description above of downlink data transmission for a process of downlink data transmission, so a repeated description thereof will be omitted here.

Fourth Example

Figure 7:
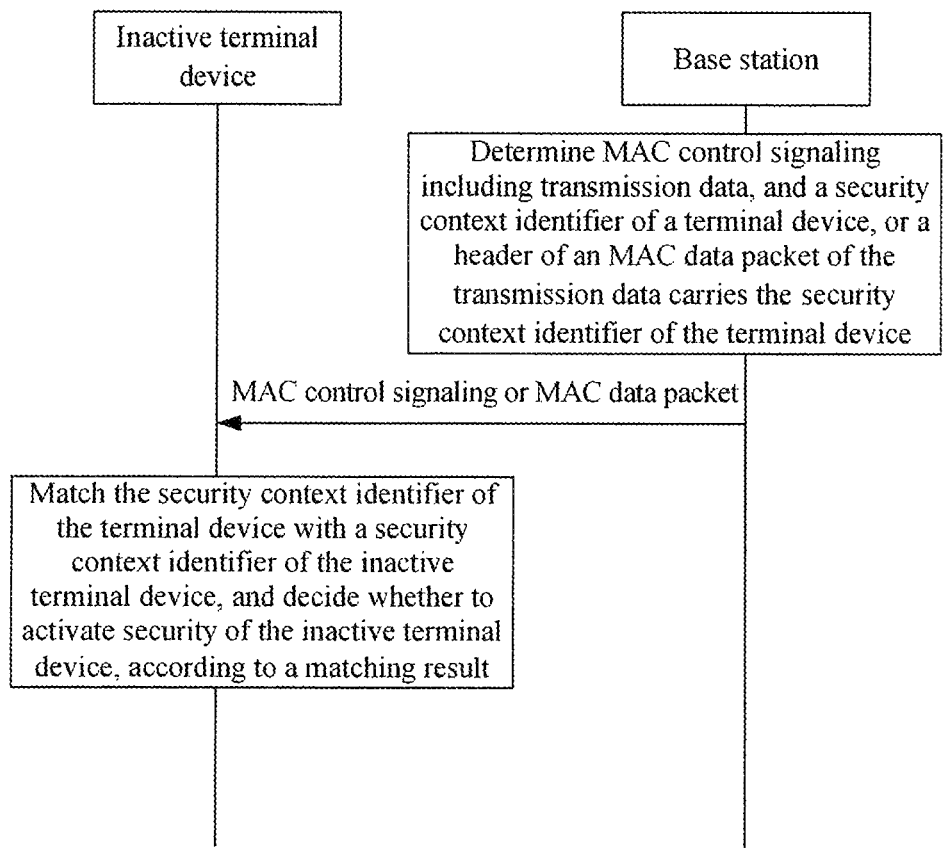
FIG. 7 is a schematic flow chart of another method for transmitting downlink data according to an embodiment of the invention.

As illustrated in FIG. 7, the base station initiates downlink data transmission to the inactive terminal device. Transmission data and a security context identifier of the terminal device are carried in MAC control signaling, or a header of an MAC data packet of the transmission data carries the security context identifier of the terminal device. Optionally the base station can protect the transmission data for integrity. Reference can be made to the description above of downlink data transmission for a process of downlink data transmission, so a repeated description thereof will be omitted here.

In a method for transmitting data according to an embodiment of the invention, a first device transmits both transmission data, and a security context identifier of an inactive terminal device to a second device, and the second device can match the security context identifier of the inactive terminal device with a local security context identifier of at least one terminal device, and decides whether to activate the security of the inactive terminal device, according to a result of matching. For uplink data transmission, the first device is the inactive terminal device, and the second device is a base station; and for downlink data transmission, the first device is a base station, and the second device is the inactive terminal device. Accordingly with the method for transmitting data according to the embodiment of the invention, data can be transmitted securely between the inactive terminal device and the base station to thereby address the problem that the inactive terminal device cannot transmit data securely with the base station in the security mechanism in the existing traditional wireless communication systems.

Second Embodiment

Figure 8:
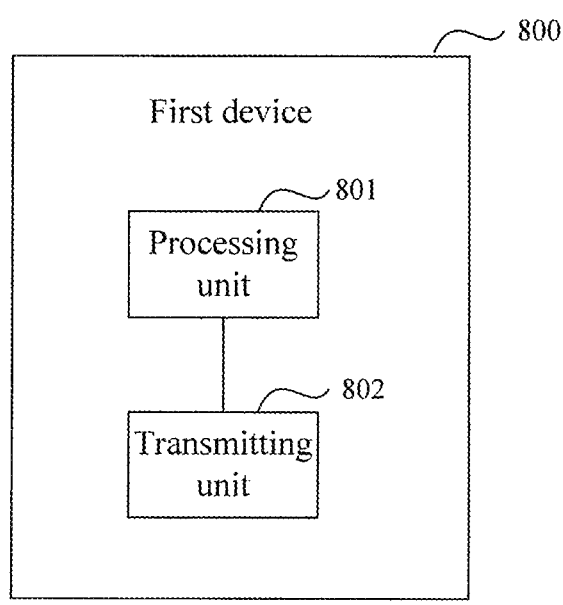
FIG. 8 is a schematic structural diagram of a first terminal device according to an embodiment of the invention.

Further to the embodiment above, an embodiment of the invention further provides a first device, which can perform the method at the first device side according to the embodiment as illustrated in FIG. 3, and as illustrated in FIG. 8, the first device 800 includes: a processing unit 801 and a transmitting unit 802.

The processing unit 801 is configured to determine a transmission message including transmission data, and a security context identifier of a terminal device which is inactive;

The transmitting unit 802 is configured to transmit the transmission message determined by the processing unit 801 to a second device, so that the second device matches the security context identifier of the terminal device with a local security context identifier of at least one terminal device, and decides whether to activate the security of the terminal device, according to a matching result.

For uplink data transmission, the first device 800 is the inactive terminal device, and the second device is a base station; and for downlink data transmission, the first device 800 is a base station, and the second device is an inactive terminal device.

Optionally the processing unit 801 is further configured to protect the transmission data for integrity using a security context corresponding to the security context identifier of the terminal device before the transmission message including the transmission data, and the security context identifier of the terminal device is determined.

Optionally the security context includes one or more of: a key, an encryption algorithm, an integrity-protection algorithm, a carrier identifier, a counter, and a security constant.

Optionally when the first device 800 is the terminal device, and the second device is a base station, the transmission message is layer-2 control signaling or a Radio Resource Control (RRC) message.

Optionally when the first device 800 is a base station, and the second device is the terminal device, the transmission message is one of: Layer-2 control signaling, a Radio Resource Control (RRC) message, and physical-layer control signaling.

It shall be noted that in the embodiment of the invention, the first device has been divided into the units only by way of an example dependent upon their logic functions, but can alternatively be divided otherwise in a real implementation. The integrated units above can be embodied in a hardware form, or can be embodied as software functional units.

If the integrated units are embodied as software functional units, and sold or used as separate products, then they may be stored in a computer readable storage medium. Based upon such understanding, the technical solutions according to the invention essentially, or their parts contributing to the prior art, or a part or all of the technical solutions can be embodied in the form of a computer software product, which can be stored in a storage medium, and which includes several instructions to cause a computer device (e.g., a personal computer, a server, a network device, etc.) or a processor to perform a part or all of the steps in the method according to the respective embodiments of the invention. The storage medium includes a U-disk, a mobile hard disk, a Read-Only Memory (ROM), a Random Access Memory (RAM), a magnetic-disk, an optical disk, or any other medium which can store program codes.

Figure 9A:
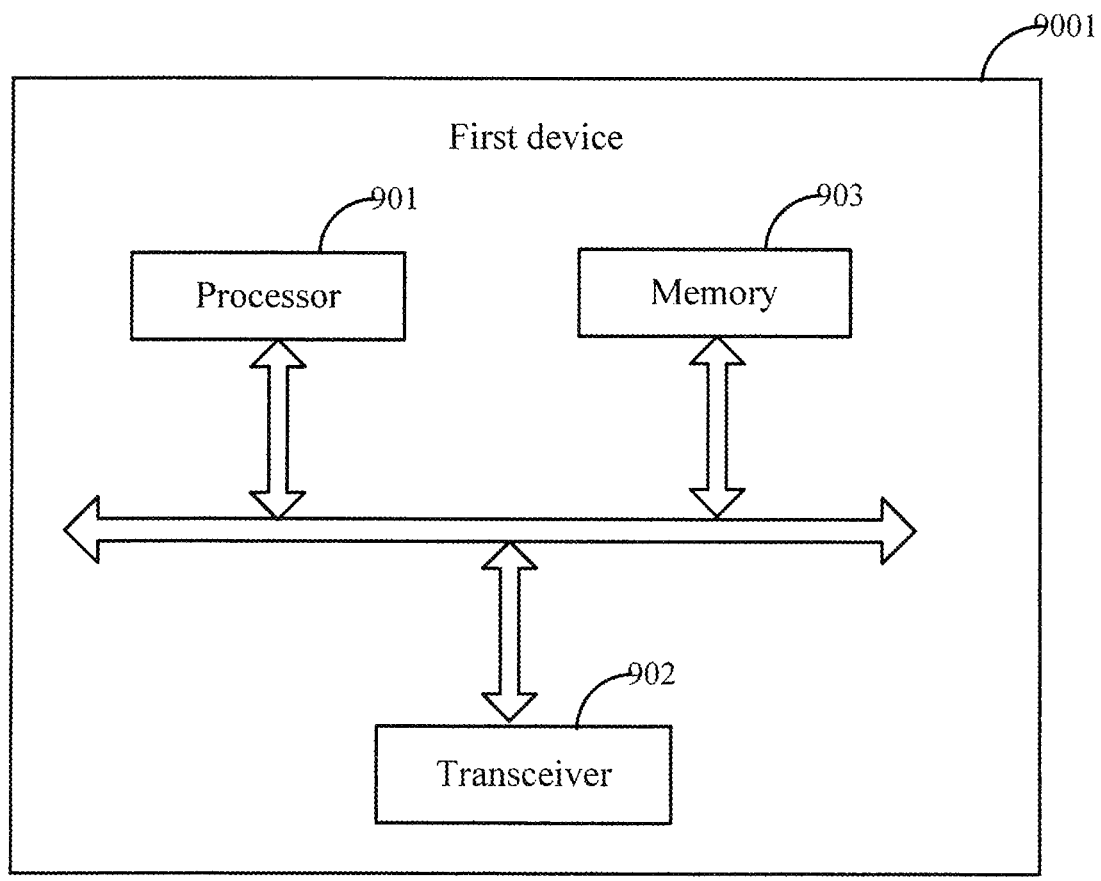
FIG. 9A is a schematic structural diagram of a first device according to an embodiment of the invention when the first device is a base station.

Further to the embodiment above, an embodiment of the invention further provides a first device, which can perform the method at the first device side according to the embodiment as illustrated in FIG. 3, and which can be the same device as the first device as illustrated in FIG. 8. As illustrated in FIG. 9A, the first device 9001 includes: a processor 901, a transceiver 902, and a memory 903.

The processor 901 is configured to read and execute program in the memory 903.

The processor 901 is configured to determine a transmission message including transmission data, and a security context identifier of a terminal device which is inactive.

The processor 901 is further configured to transmit the transmission message to a second device through the transceiver 902, so that the second device matches the security context identifier of the terminal device with a local security context identifier of at least one terminal device, and decides whether to activate the security of the terminal device, according to a matching result.

Optionally the processor 901 is further configured to protect the transmission data for integrity using a security context corresponding to the security context identifier of the terminal device before the transmission message including the transmission data, and the security context identifier of the terminal device is determined.

Optionally the security context includes one or more of: a key, an encryption algorithm, an integrity-protection algorithm, a carrier identifier, a counter, and a security constant.

When the first device 9001 is the terminal device, and the second device is a base station, the transmission message can be layer-2 control signaling or a Radio Resource Control (RRC) message.

When the first device 9001 is a base station, and the second device is the terminal device, the transmission message can be one of: Layer-2 control signaling, a Radio Resource Control (RRC) message, or physical-layer control signaling.

As illustrated in FIG. 9A, the first device 9001 can include a bus over which the processor 901, the transceiver 902, and the memory 903 can be connected, where the bus architecture can include any number of interconnecting buses and bridges, and the bus architecture can further link together various other circuits, e.g., a peripheral device, a manostat, a power management circuit, etc., all of which are well known in the art, so a further description thereof will be omitted in this context. The transceiver 902 can be a number of elements, e.g., a transmitter and a receiver, which are units for communication with various other devices over a transmission medium. The processor 901 is responsible for managing the bus architecture and performing normal processes, and the memory 903 can store data for use by the processor 901 in performing the operations.

Figure 9B:
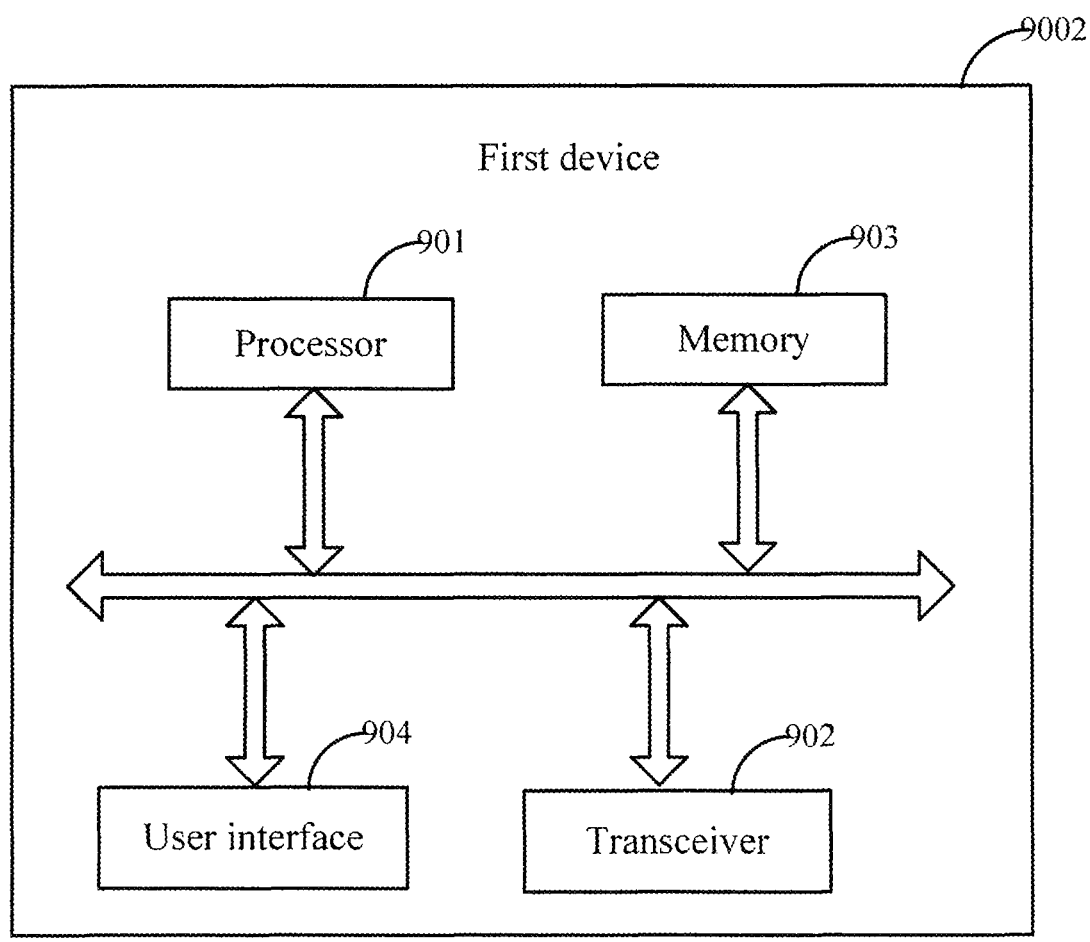
FIG. 9B is a schematic structural diagram of a first device according to an embodiment of the invention when the first device is a terminal device.

It shall be noted that when the first device is a base station, the first device can be as illustrated in FIG. 9A; and when the first device is an inactive terminal device, the first device can be as illustrated in FIG. 9B, where the first device 9002 as illustrated in FIG. 9B includes a user interface 904 in addition to FIG. 9A. For different terminal devices, the user interface 904 can also be an interface via which devices are connected internally and externally as needed, and the connected devices include but will not be limited to a keypad, a display, a speaker, a microphone, a joystick, etc.

In the first device 9001 and the first device 9002 according to the embodiments of the invention, the first device 9001 and the first device 9002 transmit both transmission data, and the security context identifier of the terminal device to the second device, and the second device can match the security context identifier of the terminal device with a local security context identifier of at least one terminal device, and decides whether to activate the security of the terminal device, according to a result of matching. For uplink data transmission, the first device 9001 and the first device 9002 are an inactive terminal device, and the second device is a base station; and for downlink data transmission, the first device 9001 and the first device 9002 are a base station, and the second device is the inactive terminal device. Accordingly with the first device 9001 and the first device 9002 according to the embodiments of the invention, data can be transmitted securely between the inactive terminal device and the base station to thereby address the problem that the inactive terminal device cannot transmit data securely with the base station in the security mechanism in the existing traditional wireless communication systems.

Third Embodiment

Figure 10:
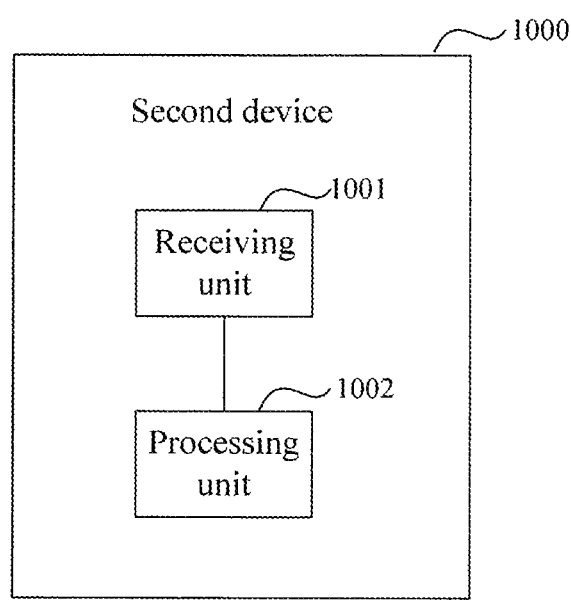
FIG. 10 is a schematic structural diagram of a second device according to an embodiment of the invention.

Further to the embodiments above, an embodiment of the invention further provides a second device which can perform the method at the second device side according to the embodiment as illustrated in FIG. 3, and as illustrated in FIG. 10, the second device 1000 includes: a receiving unit 1001 and a processing unit 1002.

The receiving unit 1001 is configured to receive a transmission message transmitted by a first device, where the transmission message includes transmission data, and a security context identifier of a terminal device which is inactive;

The processing unit 1002 is configured to match the security context identifier of the terminal device in the transmission message received by the receiving unit 1001 with a local security context identifier of at least one local terminal device, and to decide whether to active the security of the inactive terminal device according to a matching result.

Optionally the processing unit 1002 configured to decide whether to active the security of the inactive terminal device, according to the matching result is configured:

when the security context identifier of the inactive terminal device is matched successfully with the local security context identifier of the at least one local terminal device, to activate the security of the inactive terminal device; or when the security context identifier of the inactive terminal device fails to be matched with the local security context identifier of the at least one local terminal device, to decide not to activate the security of the inactive terminal device.

Optionally the processing unit 1002 is further configured: after the security of the inactive terminal device is activated, to obtain a security context corresponding to the security context identifier of the inactive terminal device; and to verify the transmission data for integrity protection according to the security context, and to decide whether to transmit data with the first device, according to a verification result.

Optionally the processing unit 1002 configured to decide whether to transmit data with the first device, according to the verification result is configured:

when the transmission data is verified successfully for integrity protection, to decide to transmit data with the first device; or when the transmission data fails to be verified for integrity protection, to decide not to transmit the data with the first device.

Optionally the security context includes one or more of: a key, an encryption algorithm, an integrity-protection algorithm, a carrier identifier, a counter, or a security constant.

Optionally when the first device is the terminal device, and the second device 1000 is a base station, the transmission message is layer-2 control signaling or an RRC message.

Optionally when the first device is a base station, and the second device 1000 is the terminal device, the transmission message is one of: Layer-2 control signaling, an RRC message, or physical-layer control signaling.

It shall be noted that in the embodiment of the invention, the second device has been divided into the units only by way of an example dependent upon their logic functions, but can alternatively be divided otherwise in a real implementation. The integrated units above can be embodied in a hardware form, or can be embodied as software functional units.

Figure 11A:
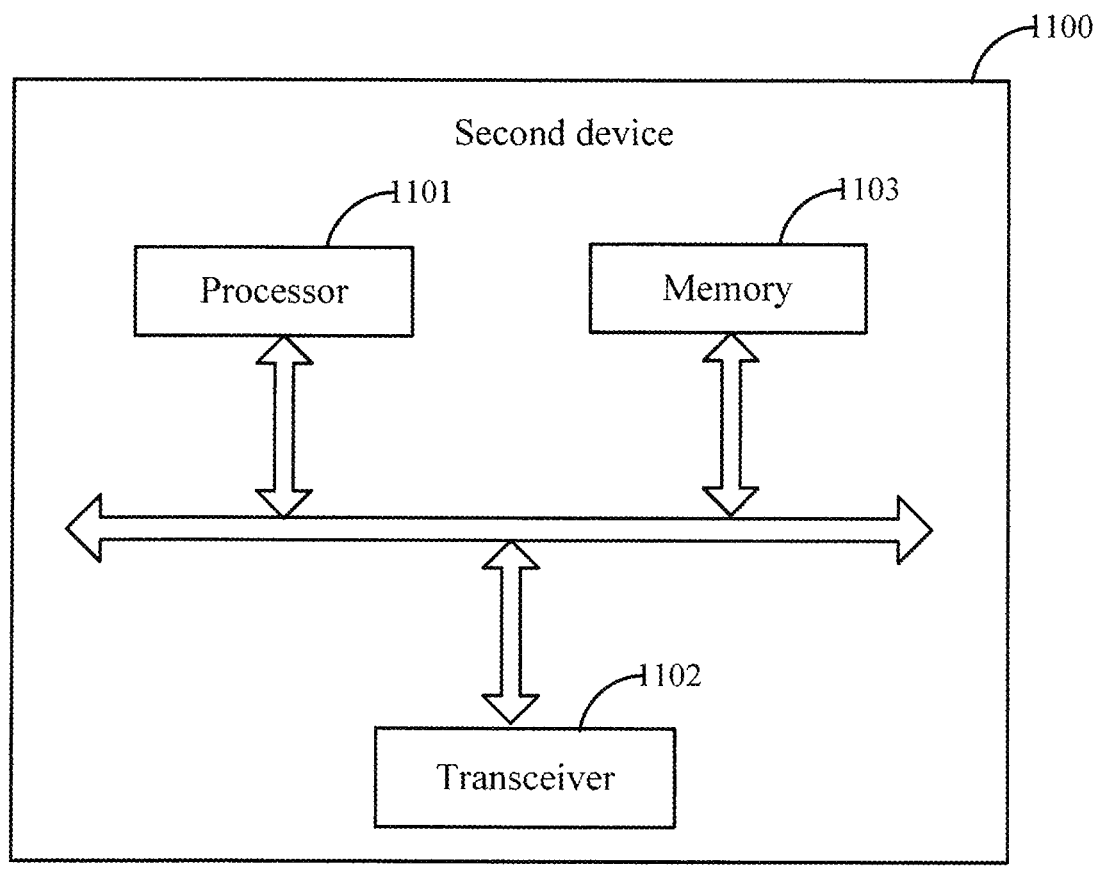
FIG. 11A is a schematic structural diagram of a second device according to an embodiment of the invention when the second device is a base station.

Further to the embodiment above, an embodiment of the invention further provides a second device which can perform the method at the second device side according to the embodiment as illustrated in FIG. 3, and which can be the same device as the first device as illustrated in FIG. 10. As illustrated in FIG. 11A, the second device 1100 includes: a processor 1101, a transceiver 1102, and a memory 1103.

The processor 1101 is configured to read and execute program in the memory 1103.

The processor 1101 is configured to receive a transmission message transmitted by a first device through the transceiver 1102, where the transmission message includes transmission data, and a security context identifier of an inactive terminal device;

The processor 1101 is configured to match the security context identifier of the inactive terminal device in the transmission message received by the transceiver 1102 with a local security context identifier of at least one local terminal device, and to decide whether to active the security of the inactive terminal device according to a matching result.

Optionally the processor 1101 configured to decide whether to active the security of the inactive terminal device, according to the matching result is configured:

when the security context identifier of the inactive terminal device is matched successfully with the local security context identifier of the at least one local terminal device, to activate the security of the inactive terminal device; or when the security context identifier of the inactive terminal device fails to be matched with the local security context identifier of the at least one local terminal device, to decide not to activate the security of the inactive terminal device.

Optionally the processor 1101 is further configured: after the security of the inactive terminal device is activated, to obtain a security context corresponding to the security context identifier of the inactive terminal device; and to verify the transmission data for integrity protection according to the security context, and to decide whether to transmit data with the first device, according to a verification result.

Optionally the processor 1101 configured to decide whether to transmit data with the first device, according to the verification result is configured:

when the transmission data is verified successfully for integrity protection, to decide to transmit data with the first device; or when the transmission data fails to be verified for integrity protection, to decide not to transmit data with the first device.

Optionally the security context includes one or more of: a key, an encryption algorithm, an integrity-protection algorithm, a carrier identifier, a counter, or a security constant.

Optionally when the first device is the terminal device, and the second device 1100 is a base station, the transmission message is layer-2 control signaling or an RRC message.

Optionally when the first device is a base station, and the second device 1100 is the terminal device, the transmission message is one of: Layer-2 control signaling, an RRC message, or physical-layer control signaling.

As illustrated in FIG. 11A, the second device 1100 can include a bus over which the processor 1101, the transceiver 1102, and the memory 1103 can be connected, where the bus architecture can include any number of interconnecting buses and bridges, and the bus architecture can further link together various other circuits, e.g., a peripheral device, a manostat, a power management circuit, etc., all of which are well known in the art, so a further description thereof will be omitted in this context. The transceiver 1102 can be a number of elements, e.g., a transmitter and a receiver, which are units for communication with various other devices over a transmission medium. The processor 1101 is responsible for managing the bus architecture and performing normal processes, and the memory 1103 can store data for use by the processor 1101 in performing the operations.

Figure 11B:
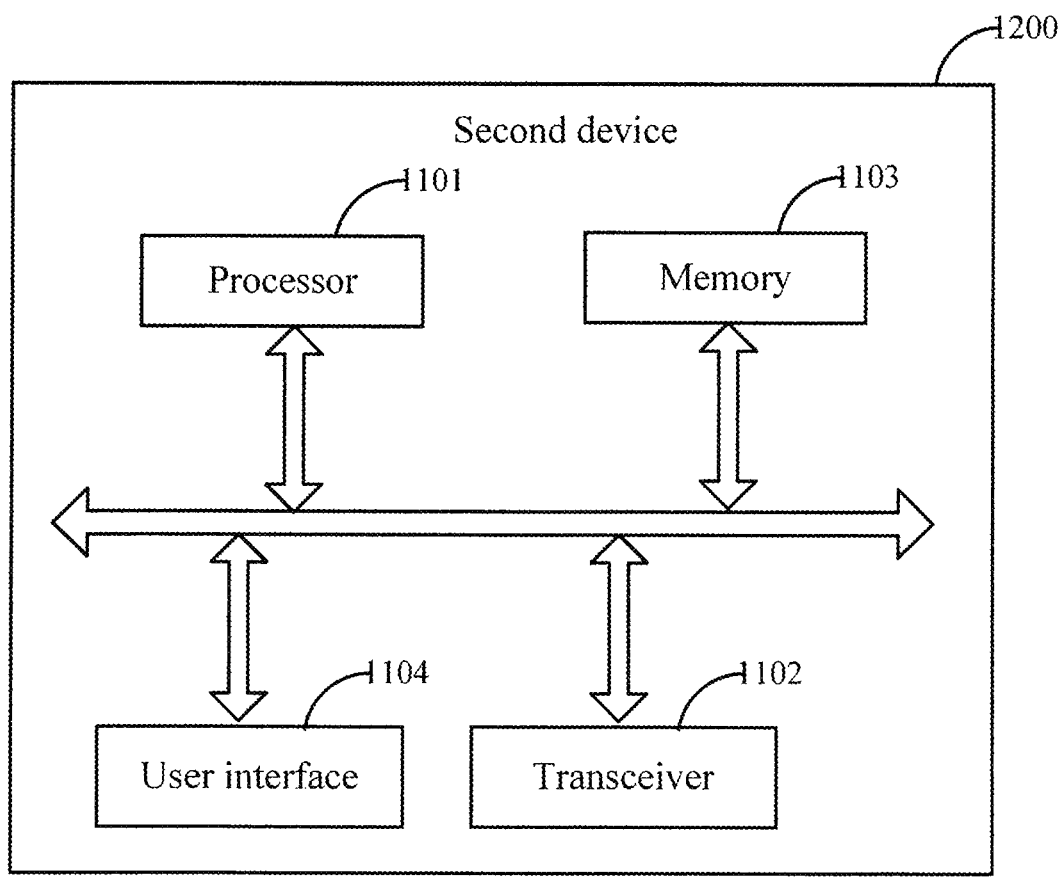
FIG. 11B is a schematic structural diagram of a second device according to an embodiment of the invention when the second device is a terminal device.

It shall be noted that when the second device is a base station, the second device can be as illustrated in FIG. 11A; and when the second device is an inactive terminal device, the second device can be as illustrated in FIG. 11B, where the second device 1200 as illustrated in FIG. 11B includes a user interface 1104 in addition to FIG. 11A. For different terminal devices, the user interface 1104 can also be an interface via which devices are connected internally and externally as needed, and the connected devices include but will not be limited to a keypad, a display, a speaker, a microphone, a joystick, etc.

In some embodiments of the invention, the second device 1100 and the second device 1200 receive transmission data and a security context identifier of an inactive terminal device transmitted from a first device. The second device 1100 and the second device 1200 match the security context identifier of the inactive terminal device with a local security context identifier of at least one local terminal device, and decide whether to activate the security of the inactive terminal device, according to the matching result. For uplink data transmission, the first device is the inactive terminal device, and the second device 1100 and the second device 1200 each is a base station; and for downlink data transmission, the first device is a base station, and the second device 1100 and the second device 1200 each is the inactive terminal device. According with the second device 1100 and the second device 1200 according to the embodiments of the invention, data can be transmitted securely between the inactive terminal device and the base station to thereby address the problem that the inactive terminal device cannot transmit data securely with the base station in the security mechanism in the existing traditional wireless communication systems.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for transmitting data, comprising:
   determining, by a first device, a transmission message comprising transmission data, and a security context identifier of an inactive terminal device, wherein the inactive terminal device is in an inactive state in which the terminal device is connected with a core network but is not air-interface connected with a base station; and
   transmitting, by the first device, the transmission message to a second device;
   wherein the security context identifier of the inactive terminal device is used for the second device to match the security context identifier of the inactive terminal device with a security context identifier of at least one local terminal device, and to decide whether to activate security of the inactive terminal device according to a matching result.

2. The method according to claim 1, wherein before the determining by the first device, the transmission message comprising the transmission data, and the security context identifier of the inactive terminal device, the method further comprises:
   protecting, by the first device, the transmission data for integrity using a security context corresponding to the security context identifier of the inactive terminal device.

3. The method according to claim 2, wherein the security context comprises one or more of:
   a key,
   an encryption algorithm,
   an integrity-protection algorithm,
   a carrier identifier,
   a counter, or
   a security constant.

4. The method according to claim 1, wherein the first device is the inactive terminal device, the second device is a base station, and the transmission message is layer-2 control signaling or a Radio Resource Control (RRC) message.

5. The method according to claim 1, wherein the first device is a base station, the second device is the inactive terminal device, and the transmission message is one of:
   layer-2 control signaling,
   a Radio Resource Control (RRC) message, or
   physical-layer control signaling.

6. A method for transmitting data, comprising:
   receiving, by a second device, a transmission message transmitted from a first device, wherein the transmission message comprises transmission data, and a security context identifier of an inactive terminal device, wherein the inactive terminal device is in an inactive state in which the terminal device is connected with a core network but is not air-interface connected with a base station;
   matching, by the second device, the security context identifier of the inactive terminal device with a security context identifier of at least one local terminal device; and deciding, by the second device, whether to active security of the inactive terminal device according to a result of the matching.

7. The method according to claim 6, wherein the deciding, by the second device, whether to active the security of the inactive terminal device according to the result of the matching comprises:
when the security context identifier of the inactive terminal device is matched successfully with the security context identifier of the at least one local terminal device, activating, by the second device, the security of the inactive terminal device; or
when the security context identifier of the inactive terminal device fails to be matched with the security context identifier of the at least one local terminal device, deciding, by the second device, not to activate the security of the inactive terminal device.

8. The method according to claim 6, wherein after the activating, by the second device, the security of the inactive terminal device, the method further comprises:
obtaining, by the second device, a security context corresponding to the security context identifier of the inactive terminal device;
verifying, by the second device, the transmission data for integrity protection according to the security context; and
deciding, by the second device, whether to transmit data with the first device according to a result of the verifying.

9. The method according to claim 8, wherein the deciding, by the second device, whether to transmit data with the first device according to the result of the verifying comprises:
when the transmission data is verified successfully for integrity protection, deciding, by the second device, to transmit data with the first device; or
when the transmission data fails to be verified for integrity protection, deciding, by the second device, not to transmit data with the first device.

10. The method according to claim 8, wherein the security context comprises one or more of:
a key,
an encryption algorithm,
an integrity-protection algorithm,
a carrier identifier,
a counter, or
a security constant.

11. The method according to claim 6, wherein the first device is the inactive terminal device, the second device is a base station, and the transmission message is layer-2 control signaling or a Radio Resource Control (RRC) message.

12. The method according to claim 6, wherein the first device is a base station, the second device is the inactive terminal device, and the transmission message is one of:
layer-2 control signaling,
a Radio Resource Control (RRC) message, or
physical-layer control signaling.

13. A second device, comprising: a processor, a memory, and a transceiver, wherein:
the processor is configured to read and execute program in the memory:
to receive, through the transceiver, a transmission message transmitted from a first device, wherein the transmission message comprises transmission data, and a security context identifier of an inactive terminal device, wherein the inactive terminal device is in an inactive state in which the terminal device is connected with a core network but is not air-interface connected with a base station;
to match the security context identifier of the inactive terminal device in the transmission message received through the transceiver with a security context identifier of at least one local terminal device; and
to decide whether to active security of the inactive terminal device according to a matching result.

14. The second device according to claim 13, wherein the processor configured to decide whether to active the security of the inactive terminal device, according to the matching result is configured:
when the security context identifier of the inactive terminal device is matched successfully with the security context identifier of the at least one local terminal device, to activate the security of the inactive terminal device; or
when the security context identifier of the inactive terminal device fails to be matched with the security context identifier of the at least one terminal device, to decide not to activate the security of the inactive terminal device.

15. The second device according to claim 13, wherein the processor is further configured:
after the security of the inactive terminal device is activated, to obtain a security context corresponding to the security context identifier of the inactive terminal device;
to verify the transmission data for integrity protection according to the security context; and
to decide whether to transmit data with the first device, according to a verification result.

16. The second device according to claim 15, wherein the processor configured to decide whether to transmit data with the first device, according to the verification result is configured:
when the transmission data is verified successfully for integrity protection, to decide to transmit data with the first device; or
when the transmission data fails to be verified for integrity protection, to decide not to transmit data with the first device.

17. The second device according to claim 15, wherein the security context comprises one or more of:
a key,
an encryption algorithm,
an integrity-protection algorithm,
a carrier identifier,
a counter, or
a security constant.

18. The second device according to claim 13, wherein the first device is the inactive terminal device, the second device is a base station, and the transmission message is layer-2 control signaling or a Radio Resource Control (RRC) message.

19. The second device according to claim 13, wherein the first device is a base station, the second device is the inactive terminal device, the transmission message is one of:
layer-2 control signaling,
a Radio Resource Control (RRC) message, or
physical-layer control signaling.

* * * * *